United States Patent Office 3,506,610
Patented Apr. 14, 1970

3,506,610
BENZOPHENONE ULTRAVIOLET LIGHT AND OXIDATION STABILIZERS FOR PLASTIC MATERIALS
Hans Dressler, Pitcairn, and Kenneth G. Reabe, Delmont, Pa., assignors to Koppers Company, Inc., a corporation of Delaware
No Drawing. Original application Oct. 23, 1965, Ser. No. 504,095. Divided and this application Mar. 1, 1968, Ser. No. 709,821
Int. Cl. C08f *45/58;* C08g *51/58*
U.S. Cl. 260—45.95
6 Claims

ABSTRACT OF THE DISCLOSURE

Plastic compositions such as polyethylene, polypropylene, polyvinyl acetate, polyvinyl chloride, copolymers of vinylidene chloride and vinyl chloride, nitrocellulose, ethylcellulose, cellulose acetate, and polyester resins are stabilized against oxidation and ultraviolet light degradation by 4-benzoyl - 6 - (dialkyl - hydroxybenzyl)resorcinal compounds. The compounds are usually added in an amount of from about 0.01 to 5 percent by weight of the polymer.

CROSS-REFERENCE

This application is a division of U.S. Patent application Ser. No. 504,095, filed Oct. 23, 1965.

This invention relates to stabilizers for plastics. More specifically, it relates to plastic compositions stabilized against degradation resulting from exposure to ultraviolet radiation and stabilized against oxidation.

It is well known that many plastic materials tend to undergo deterioration upon exposure to ultraviolet radiation. Light having wave lengths of about 290–400 millimicrons causes photocatalyzed changes, such as yellowing or embrittlement, in unstabilized polymers. This is particularly undesirable for colorless, translucent, and transparent plastics which are required to withstand long exposure to sunlight. To overcome this problem it is usually necessary to stabilize plastics, such as for use in translucent roofing, transparent structures, protective coatings, impact-resistant windows, and decorative structures, which are subject to prolonged exposure to ultraviolet radiation.

As a general rule, an effective ultraviolet light stabilizer should have a molar extinction coefficient is equal to or greater than 4.0 in the 300–400 millimicron spectral region to have potential value as an ultraviolet light stabilizer for plastics. However, individual plastics are generally most susceptible to deterioration by radiation of particular wave lengths. Thus, polyethylene and polystyrene are susceptible to radiation having a wave length of 300–320 millimicrons, while polypropylene is most sensitive to radiation at 370 millimicrons.

It is also known that many plastic materials tend to undergo deterioration in the presence of oxygen. The rate of deterioration, of course, is dependent upon the oxygen content of the atmosphere to which the material is exposed, the temperature, pressure, and the like. The presence of sunlight is known to accelerate oxidation deterioration when oxidation conditions exist.

Therefore, such plastic materials are usually stabilized against both oxidation deterioration and ultraviolet light deterioration. This presents formulation problems because a good oxidation stabilizer may tend of itself to yellow the plastic material under prolonged ultraviolet light exposure, thus countering the effect of the ultraviolet light stabilizer. A good ultraviolet light stabilizer, while it may inhibit photo-oxidation in the plastic material, may deleteriously affect the anti-oxidant stabilizer and thereby counter its protective properties.

The choice of a good ultraviolet light stabilizer and a good oxidation stabilizer is thus narrowed to a range of compounds which may not necessarily be economically wise choices. A single compound which would provide both oxidation stabilization and stabilization against ultraviolet light degradation is extremely desirable.

Quite surprisingly, we have discovered certain 4-benzoyl-6-(dialkyl - hydroxybenzyl)resorcinol compounds which are compatible with and effective in a large number of plastic materials and exhibit outstanding ultraviolet light absorbing properties as well as anti-oxidant properties.

It is therefore an object of the present invention to provide a composition which is resistant to degradation by ultraviolet radiation and oxidation.

It is another object of the present invention to provide plastic compositions containing the 4-benzoyl-6-(dialkyl-hydroxybenzyl)-resorcinol compounds which are substantially resistant to photo-oxidation deterioration.

In accordance with the present invention, we have discovered that 4-benzoyl-6-(dialkyl-hydroxybenzyl)resorcinol compounds are particularly useful as ultraviolet light and oxidation stabilizing agents for plastic materials.

Useful 4-benzoyl-6-(dialkyl-hydroxybenzyl)resorcinol compounds have the formula:

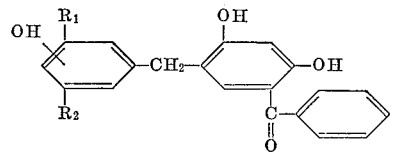

In the above formula $R_1$ is an alkyl radical having from 1–4 carbon atoms such as methyl, ethyl, n-propyl, isopropyl, n-butyl, isobutyl and t-butyl. $R_2$ is an alkyl radical having from 1–4 carbon atoms such as methyl, ethyl, n-propyl, isopropyl, n-butyl, isobutyl and t-butyl.

The ultraviolet light and oxidation stabilizer of the present invention can be readily incorporated into the plastic material by various standard procedures. In one technique the dry stabilizer in powdered form is mixed with a powdered or granular plastic and the mixture is then appropriately treated by molding or extruding. In another procedure an aqueous suspension or emulsion of finely divided polymeric material may be admixed with a suspension or emulsion of the stabilizing agent. Alternatively, it is possible to spray or mix a polymeric material in powdered or granular form with a solution or dispersion of the stabilizing agent in an appropriate solvent, such as hexane or benzene. It is also possible to incorporate the stabilizing agent in a finished article by introducing the plastic material into a bath containing the stabilizing agent in an appropriate liquid solvent and permitting the plastic material to remain in the bath for some time until the plastic has been properly treated. Thereafter, the material is dried to remove any of the remaining solvent. Plastic material in the form of fibers and films may also be sprayed with a solution or suspension of the stabilizing agent in a solvent or dispersant by any standard technique.

The plastic material should contain a stabilizing amount of the ultraviolet light-absorbing and oxidation agent; that is, the amount of stabilizing agent sufficient to prevent deterioration and embrittlement of the plastic material. The amount of stabilizing agent to be used will depend to a large extent upon the amount of exposure to which plastic is subjected and the nature of the plastic to be treated. The agent is generally added in an amount of between 0.01 and 5 percent by weight of the plastic material and preferably between 0.1 and 4 percent by weight.

The stabilizing agent imparts protection against ultraviolet radiation and oxidation to numerous plastic materials which are sensitive to ultraviolet light and photooxidation. These include, for example, clear films made of polyester resins, polyvinyl chloride, and cellulose acetate, which are used in packaging dyed textile articles and automobile seat covers. The agent also protects flame-resistant, halogen-containing polyesters and styrene-modified maleate glycol resins used in the preparation of glass fiber-reinforced structural panels which are subject to discoloration on outdoor exposure. The stabilizer is effective for protecting polyethylene, polypropylene, polystyrene, polyvinyl acetate, polyvinylchloride, copolymers of vinyl chloride and vinylidene chloride, cellulose resins, such as nitrocellulose, ethylcellulose, and cellulose acetate, and numerous other materials. The agent can be used alone or together with other additives, such as fillers, pigments, etc.

The invention is further illustrated by the following examples:

EXAMPLE 1

A condensation reaction was carried out using 2-hydroxy-3-t-butyl-5-methylbenzylalcohol and 4-benzoylresorcinol.

19.4 grams (0.1 m.) of 2-hydroxy-3-t-butyl-5-methylbenzyl-alcohol and 21.4 grams (0.1 m.) of 4-benzoylresorcinol were added to about 200 ml. of benzene in a 500 ml. flask. 8.0 ml. of concentrated hydrochloric acid (12 N) were added as catalyst. The solution was stirred and refluxed for two hours at 72° C.

The resulting reaction mixture was neutralized with a 5% sodium bicarbonate solution. The organic phase was decanted off and stirred with 4.0 grams of decolorizing carbon. This solution was then filtered and the benzene evaporated under vacuum. The resulting product was 40.1 grams of an amber resin. The infrared spectrum identified the product as 4-benzoyl-6-(2-hydroxy-3-t-butyl-5-methylbenzyl)resorcinol which has the structural formula:

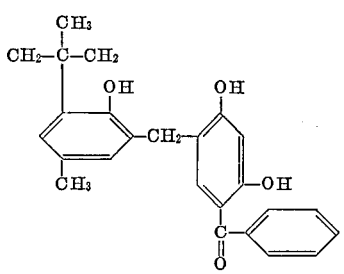

The product is an excellent ultraviolet light stabilizer. It has a molar extinction coefficient of log ε equal to or greater than 4.0 millimicrons. The product also is a valuable stabilizer against the deleterious effects of oxidation.

EXAMPLE II

A condensation reaction was carried out using 3-methyl-4-hydroxy-5-t-butylbenzylalcohol and 4-benzoylresorcinol.

19.1 grams (0.1 m.) of 3-methyl-4-hydroxy-5-t-butylbenzylalcohol and 21.4 grams (0.1 m.) of 4-benzoylresorcinol were added to about 200 ml. of benzene in a 500 ml. flask. 18.0 ml. of concentrated (12 N) hydrochloric acid and 2.0 grams of oxalic acid were added as catalyst. The solution was stirred and refluxed for two hours at 72° C. The reaction mixture was washed with water and neutralized with a 5% sodium bicarbonate solution. The organic phase was decanted off and stirred with 4.0 grams of decolorizing carbon. This solution was then filtered and the benzene evaporated under vacuum. The resulting product was 35.1 grams of an amber resin. The infrared spectrum identified the product as 4-benzoyl-6-(3-methyl-4-hydroxy-5-t-butylbenzyl)resorcinol which has the structural formula:

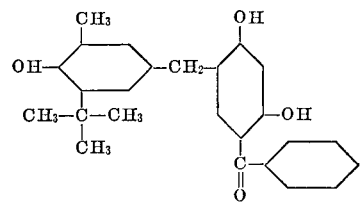

The product is an excellent ultraviolet light stabilizer. It has a molar extinction coefficient of log ε equal to or greater than 4.0 in the spectral range of 280–305 millimicrons. The product is also a good stabilizer against oxidation.

EXAMPLE III

The products of Example I, 4-benzoyl-6-(2-hydroxy-3-t-butyl-5-methylbenzyl)resorcinol, and Example II, 4-benzoyl-6-(3-methyl-4-hydroxy-5-t-butylbenzyl) resorcinol were tested to determine their ability to stabilize polystyrene against ultraviolet light degradation. The stabilizers in an amount of 0.1 part by weight were blended with 100 parts of polystyrene beads by rolling in a jar mill. The stabilized bead samples and a control sample were extruded into pellets from which discs two inches in diameter and ⅛ inch thick were molded by injection molding. These molded discs were then exposed to ultraviolet radiation under a 325 watt Hanovia lamp for 120 hours. A Yellowness Index, which represents the relative degree of yellow coloration based upon spectrophotometric analysis, was determined for the samples of each of the compositions. The difference in the Yellowness Index before and after exposure or the amount of discoloration caused by the ultraviolet radiation is designated as the "Yellowness Factor." Results of the test are given in the table below:

TABLE I

| Stabilizer | Weight, percent | Yellowness factor |
| --- | --- | --- |
| 4-benzoyl-6-(3-hydroxy-3-t-butyl-5-methylbenzyl)resorcinol | 0.1 | −0.1 |
| 4-benzoyl-6-(3-methyl-4-hydroxy-5-t-butylbenzyl)resorcinol | 0.1 | 0.6 |
| Control I | None | 5.2 |
| Control II | None | 4.0 |

EXAMPLE IV

Two polyester rest specimens were made using sixty parts by weight maleic anhydride-phthalic anhydride-propylene glycol polyester resin, forty parts by weight stryene, and one percent benzoyl peroxide. In addition, one of the specimens contained 1.0 percent by weight 4-benzoyl-6-(2-hydroxy-3-t-butyl-5-methylbenzyl)resorcinol. Clear castings were cured at 60–150° C. After 240 hours irradiation, the tested specimen showed a yellowness factor of 1.0, in marked contrast with the control of 10.9.

EXAMPLE V

One hundred parts of low density polyethylene and 0.025 percent by weight 4-benzoyl-6-(2-hydroxy-3-t-butyl-5 - methylbenzyl)resorcinol were blended together by milling on a two roll mill at 170° C. for ten minutes. Another sample was similarly prepared using 0.025 percent by weight of a commercial standard anti-oxidant 4,4'-thiobis(6-t-butyl-m-cresol) as the stabilizer. A third sample was prepared as a control. The samples were tested as 12–15 mil films at 110° C.

The results of the oxidation stabilization tests are shown in Table II:

TABLE II

| | Hours to embrittlement |
|---|---|
| 4 - benzoyl - 6 - (2 - hydroxy - 3 - t - butyl - 5 - methylbenzyl)resorcinol | 536 |
| Commercial standard 4,4' thiobis(6 - t - butyl - m - cresol | 205 |
| Control | 24 |

EXAMPLE VI

Test samples similar to those in Example V were prepared except that the stabilizer content was raised to 0.05 percent by weight.

The following oxidation stabilization test results were obtained:

TABLE III

| | Hours to embrittlement |
|---|---|
| 4 - benzoyl - 6 - (2 - hydroxy - 3 - t - butyl - 5 - methylbenzyl)resorcinol | 1057 |
| Commercial standard 4,4' - thiobis(6 - t - butyl-m cresol | 665 |
| Control | 24 |

EXAMPLE VIII

One hundred parts of polypropylene were blended with 0.025 percent by weight 4-benzoyl-6-(2-hydroxy-3-t-butyl-5-methylbenzyl)-resorcinol by milling on a two roll mill at 190° C. for ten minutes.

Another sample was similarly prepared using 0.025 percent by weight of a commercial standard anti-oxidant 4,4'-thiobis(6-t-butyl-m-cresol) as the stabilizer. A third sample was prepared as a control.

A second series of samples were similarly prepared except that the stabilizer concentration was raised to 0.05 percent by weight.

The samples were tested as 13–16 mil films at 150° C.

The results of the oxidation stabilization tests were as shown in Table IV.

TABLE IV

| | Hours to embrittlement | |
|---|---|---|
| | 0.025% by weight stabilizer | 0.05% by weight stabilizer |
| 4-benzoyl-6-(2-hydroxy-3-t-butyl-5-methylbenzyl)resorcinol | 33 | 487 |
| Commercial standard 4,4'-thiobis(6-t-butyl-m-cresol) | 385 | 825 |
| Control | 12 | 12 |

We claim:
1. A polymeric composition stabilized against oxidation and against ultraviolet degradation comprising a polymer selected from the group consisting of polyethylene, polypropylene, polystyrene, polyvinyl acetate, polyvinyl chloride copolymers of vinylidene chloride and vinyl chloride, nitrocellulose, ethylcellulose, cellulose acetate, resins and containing a stabilizing amount of a compound having the formula:

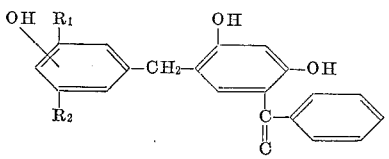

wherein $R_1$ is an alkyl radical having from 1–4 carbon atoms and $R_2$ is an alkyl radical having from 1–4 carbon atoms.

2. The polymeric composition of claim 1 wherein the amount of stabilizer is 0.01 to 5 percent by weight of said polymer.

3. The polymeric composition of claim 1 wherein said polymer comprises polystyrene and said compound is 4-benzoyl - 6 - (2 - hydroxy-3-t-butyl-5-methylbenzyl)resorcinol.

4. The polymeric composition of claim 1 wherein said polymer comprises polystyrene and said compound is of 4 - benzoyl-6-(3-methyl-4-hydroxy-5-t-butylbenzyl)resorcinol.

5. The polymeric composition of claim 1 wherein said polymer comprises a polyolefin selected from the group consisting of polyethylene and polypropylene and said compound is 4-benzoyl-6-(2-hydroxy-3-t-butyl-5-methylbenzyl)resorcinol.

6. The polymeric composition of claim 1 wherein said polymer comprises a polyester resin and said compound is 4 benzoyl - 6 - (2 - hydroxy - 3 - t - butyl - 5 - methylbenzyl)resorcinol.

References Cited

UNITED STATES PATENTS

| 2,568,894 | 9/1951 | Mackey | 260—45.95 |
| 2,976,259 | 3/1961 | Hardy et al. | 260—45.95 |
| 3,261,791 | 7/1966 | Hecker et al. | 260—45.95 |

HOSEA E. TAYLOR, JR., Primary Examiner

U.S. Cl. X.R.

106—187; 260—591